United States Patent [19]

Kellar et al.

[11] Patent Number: 4,777,598
[45] Date of Patent: Oct. 11, 1988

[54] IMAGE PROCESSING SYSTEMS AND METHODS

[75] Inventors: Paul R. N. Kellar, Newbury; Adam R. Rae-Smith, Kintbury, both of Great Britain

[73] Assignee: Quantel Limited, Kenley, United Kingdom

[21] Appl. No.: 827,240

[22] Filed: Feb. 7, 1986

[30] Foreign Application Priority Data

Mar. 22, 1985 [GB] United Kingdom ............... 8507449

[51] Int. Cl.$^4$ .............................................. G06F 15/42
[52] U.S. Cl. .................................. 364/413.22; 382/6; 378/901
[58] Field of Search ..................... 364/414, 404, 421; 382/6, 56, 54; 378/25, 4, 9, 11, 15, 21, 22, 24, 26, 901

[56] References Cited

U.S. PATENT DOCUMENTS

| | | | |
|---|---|---|---|
| 4,516,261 | 5/1985 | Harding | 364/414 |
| 4,559,557 | 12/1985 | Keyes | 364/414 |
| 4,562,540 | 12/1985 | Devaney | 364/414 |
| 4,570,224 | 2/1986 | Shimoni | 364/414 |
| 4,616,319 | 10/1986 | Peters | 364/414 |
| 4,654,795 | 3/1987 | Shimoni | 364/414 |
| 4,654,797 | 3/1987 | Fujita | 364/414 |
| 4,656,584 | 4/1987 | Katsumata | 364/414 |
| 4,665,539 | 5/1987 | Gelak | 364/414 |
| 4,670,840 | 6/1987 | Freundlich | 364/414 |
| 4,672,651 | 6/1987 | Horiba | 364/414 |

*Primary Examiner*—Michael R. Fleming
*Attorney, Agent, or Firm*—Cooper & Dunham

[57] ABSTRACT

A processing system and method which produces and manipulates images of a three dimensional object. Patches of video signals (called cameos) representing different parallel planes of an object are stored in a frame store from which each cameo can be accessed individually and manipulated as desired. When the effect of a change in orientation or position of the object is required in the output image each cameo is accessed and manipulated in the same manner and combined using key and priority signals. The manipulation is achieved by writing incoming video signals into addresses in a store determined by the manipulation required and provided as address maps. The medical embodiment replaces the cameos with frames of signals representing tomographic sections of a patient and uses a LUT to provide a window for certain ranges of signals.

22 Claims, 4 Drawing Sheets

PLANE 6

PLANE 5

PLANES 2,3,4

PLANE 1

PLANE 0

PLANE 1

PLANE 2

PLANE 1

PLANE 2

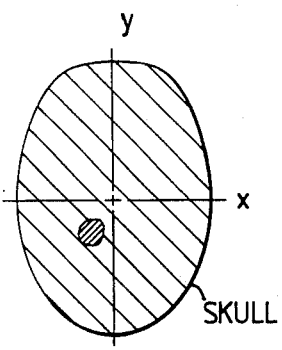
AT $Z_1$
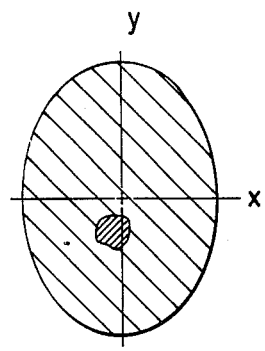
AT $Z_4$
Fig.5a.
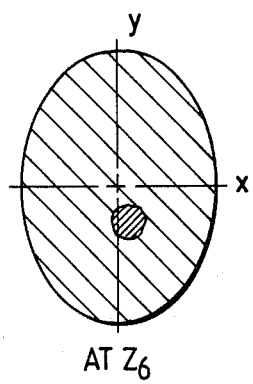
AT $Z_6$
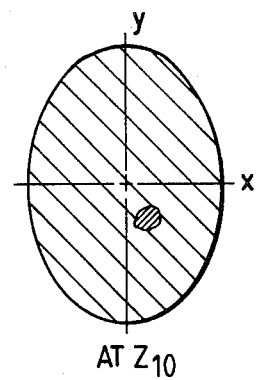
AT $Z_{10}$
Fig.5b.
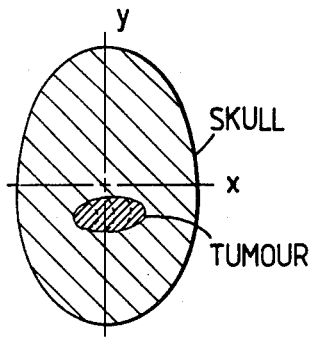
SKULL
TUMOUR
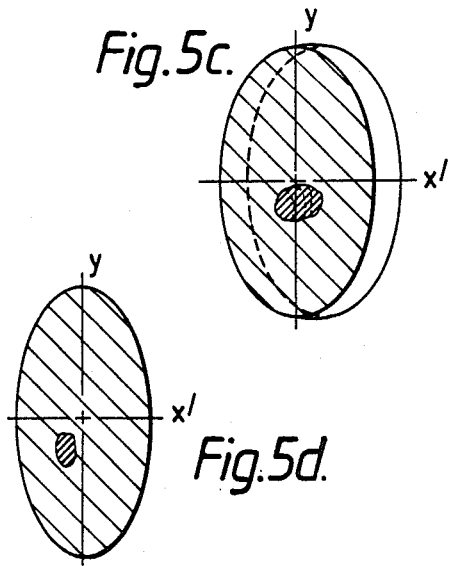
Fig.5c.
Fig.5d.

IMAGE PROCESSING SYSTEMS AND METHODS

BACKGROUND TO THE INVENTION

This invention relates to improvements in image processing systems and methods particularly those which produce and manipulate images of three dimensional objects.

In our co-pending U.K. patent application No. 8408114 (UK publication number 2137856) there is described a video signal processing system which manipulates video signals representing characters so that, for example, there is produced the effect of a change in size or orientation of that character. The manipulated character can then be output so that it forms part of an image.

To allow greater flexibility in the system the video signals representing each character are stored in a small patch of addresses (called a tile) in a frame store. Several of these tiles can be stored in one frame store thus reducing the amount of storage required. Each tile can then be accessed individually and manipulated in a desired manner and then written into the correct addresses in the output frame store. The manipulation is done using a manipulator as described in co-pending U.K. application publication number 2119594. Prior to manipulation an individual tile of video signals representing a character is read into a small fast access store to provide greater access speeds. The provision of this store, the relatively small number of pixels in each tile and the speed of the manipulator allows many characters to be manipulated within a single field time.

Although this system provides flexibility of processing the use of only two dimensional characters limits its applications. There are many field in which is is desirable to be able to produce and manipulate images of three dimensional objects. Two such fields are video production and in medical imaging.

In the video field, for example, in certain simulator systems, there is a requirement for a system which could produce an image of a three dimensional object and which could manipulate the image so that changes in orientation and position of the object can be seen. For example, if a simulated scene consisted of a seascape and a ship it would enhance the life like effect if the ship could be shown say turning and moving away or towards the observer. Obviously as the ship turns parts of the ship that were previously obscured would come into view and so signals representing the whole exterior of the ship need to be available. The prior art method of producing this effect has been to take video pictures of a model of the object at say 1° of turn intervals and then storing them and outputting in sequence. Obtaining video pictures in this manner is time consuming and expensive and the resulting image can show jerkiness as the object turns.

In medical imaging systems scanners such as CT or MRI scanners can produce video signals representing sections of the part of the patients body scanned. It would aid greatly diagnosis and preparation of treatment if these signals could be processed so that the part of the body scanned would appear as an image and if this image could then be manipulated so that part of the patient could be seen but with a different orientation to the viewer.

The creation of three dimensional images from signals obtained in this form from medical scanners has been achieved by using known algorithms, but this involves a large number of calculations and can take several hours and produces rather jagged images. Once the image has been produced the manipulation to change the apparent position of view has to be performed and there are several methods for doing this. These methods are designed to reduce the signals representing the solid object in such a way as to produce a data format that can be handled more easily. In the boundary representation method the object is defined as a space enclosed by a collection of surface primitives such as cylinders, spheres and cones which produces the required data format but this method breaks down if a gap is inadvertently introduced in the surface. A second method is the constructive solid geometry where solid primitives are used instead of the surfaces but in this case the processing is slow. One method that partially solves the problem of the time taken to manipulate the image is one in which the object is subdivided recursively in a series of cubes to produce a data structure which is in the format for a modular processor. An example of this type of processor is the Solid Engines (TM) produced by Phoenix Data Systems of Albany, USA. Although this speeds up the manipulating of the image it may be inappropriate for some applications. A further discussion of the above methods can be found in a paper entitled "The Solids Engine: A processor for Interactive Solid Modelling" given by Dr. D. J. Meagher at Nicograph 84.

OBJECT OF THE INVENTION

The object of the present invention is to provide an image processor which can produce and manipulate images of a three dimensional object.

STATEMENT OF INVENTION

According to the present invention there is provided a video image processing system comprising; input means for providing video signals representing different parallel planes of a three dimensional object, store means for storing said input video signals, means for combining said signals to produce output signals representing the three dimensional object, said combining means including; manipulating means for manipulating said input image signals representing each plane of the object in the same way so as to produce a change in the three dimensional object in the output image and selector means for selecting video signals from said manipulated signals for each picture point in said output image so that the image of the three dimensional object appears with said change applied thereto.

Further according to the invention there is provided a method of processing medical images comprising; producing video signals representing images of successive tomograms of a part of a patient, separately processing the video signals of each image to represent the transformation which occurs in the image of the respective tomograms as a result of a common change of the position or orientation of the tomograms with respect to an observer, and selectively combining video signals representing the different transformed images to produce an output image representing said part of the patient as seen from a desired viewpoint.

Further according to the present invention there is provided an image processing system comprising; means for receiving a number of frames of video signals representing different sections of a part of a patient, frame store means for storing said signals, manipulating means for manipulating said signals to produce the effect of a change in orientation of the part of the patient, means for processing said manipulated signals to produce control signals, said control signals being such as define parts of interest in said sections, combining means for combining the manipulated signals to produce the desired output image, and second frame store means for storing the combined image.

Preferably said manipulator means includes means for correcting for perspective in the image.

BRIEF DESCRIPTION OF THE DRAWINGS

The invention will now be described with reference to the accompanying drawings.

FIGS. 5a-5d example medical images.

Figure 1:
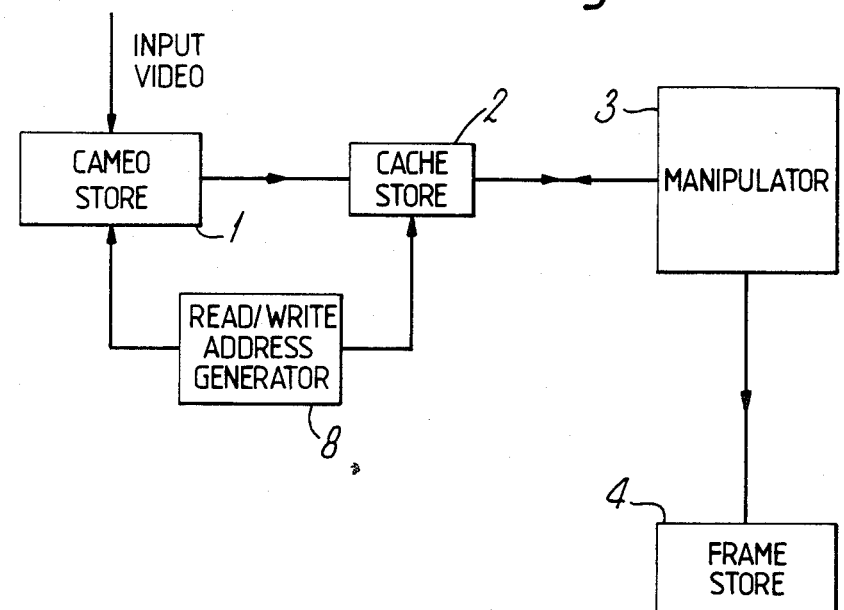
FIG. 1 shows the image processing system which forms one embodiment of the invention.
Figure 1:
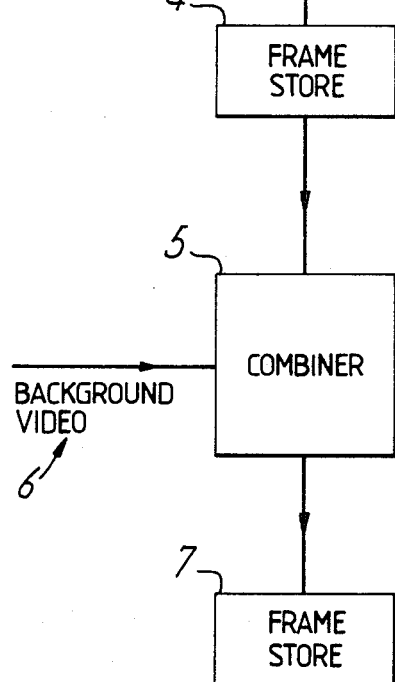

The image processing system shown in FIG. 1 is adapted to handle small video pictures called cameos which are stored in the same manner as the tiles previously described in relation to the character manipulation system. This adoption can be utilised simply in one example by storing as the cameos views of a model of a three dimensional object at 1° intervals of turn manipulating those to produce the desired effect and displaying them in sequence. This improves the speed of the system and may improve the quality of the output image but obtaining the video signals used as the cameos initially is still costly and time consuming. However, the image processing system of FIG. 1 is conditioned to produce and manipulate the required image without requiring video pictures of a model of the object from different orientations. The cameos stored for this embodiment are video signals representing different parallel planes of the object. The object can be considered to have been sliced along one axis into thin slices and these slices are represented by the cameos. The cameos may in fact be obtained by slicing a model or can be developed using video graphic equipment.

Each cameo is stored with a priority signal so that if read in sequence each plane would appear at the correct position within the object. If the first plane of the object as stored is identified as being at a distance x from the observer then the tile representing the next plane in the object will be stored so that plane is identified at a distance x+1 slice thickness. This will aid in giving the appearance in the image of a three dimensional object.

Figure 3A:
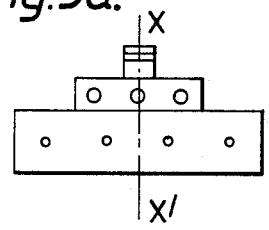
FIGS. 3a-3b examples of the final images produced by this embodiment.
Figure 2A:
FIGS. 2a-2c examples of the input images for the first embodiment.
Figure 2A:
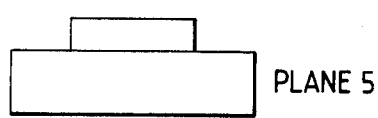
Figure 2A:
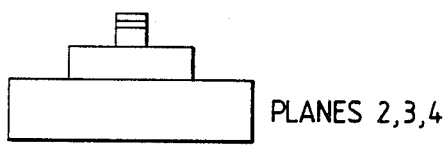
Figure 2A:
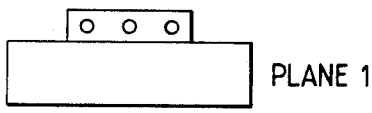
Figure 2A:
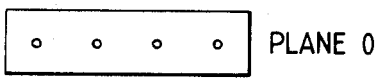
Figure 2B:
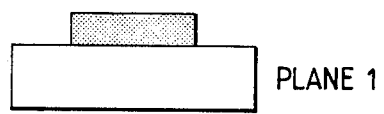
Figure 2B:
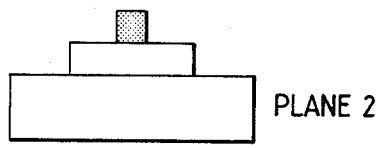
Figure 2C:
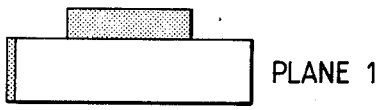
Figure 2C:
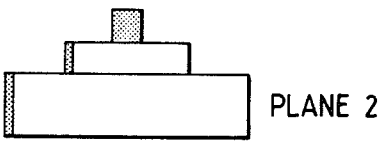

In the simplified example of the ship shown in FIGS. 2a-2c, the ship is considered to be made up of seven slices as shown in FIG. 2a. A series of cameos will be stored in the frame store each one representing one of the slices shown. If the observer is considered to be viewing the ship at approximately right angles to the direction of motion then an image of the kind seen in FIG. 3a will be produced. This image consists of signals from planes 0, 1 and 2 but only those signals in planes 1 and 2 shown shaded in FIG. 2b will appear in the complete image as the other signals in the plane are obscured by signals in the planes nearer to the observer. As the image of the ship is rotated about the xx' axis different portions of the planes will appear and when the image as in FIG. 3b can be seen those parts of planes 1 and 2 shown as shaded in FIG. 2c will form part of the image. It is to be understood that as the ship appears to turn signals from any of the planes may appear when they are not obscured by nearer planes.

To manipulate the image of the object to produce a rotation or other movement each cameo is manipulated separately but identically and the resultant cameos are combined using key and priority signals.

The incoming video signals for individual cameos consist of patches of 16 bit video signals with the 16 bits comprising an 8 bit video signal representing a pixel in a plane of the object, a 4 bit key signal and a 4 bit priority signal. These signals are stored in a patch of addresses in the store 1 and several such cameos are stored sequentially in one cameo store. For manipulation the cameos are accessed individually and written into cache store 2 from where they can be accessed at greater speed by the manipulator 3 than from the cameo store 1. This ensures that the cameos can be manipulated more easily. The cameos are accessed in sequence by means of read/write address generator 8 which identifies the address in the cameo store of the corner of the first cameo to be read and then addresses the points in the cameo until it is written into cache store 2. When the next cameo is to be addressed the address of the corner of the second cameo is generated and the process repeats.

The manipulator operates in a manner as described in co-pending application No. 8507876 the contents of which are incorporated herein by reference. The cameo is manipulated by writing the incoming video signals into the store at addresses determined by the change in orientation or size to be imparted to the object.

The addresses which produce certain changes in the image are precalculated and provided as address maps with addresses, say, for every eighth incoming pixel, every eighth line and every fourth field. The size of the address maps are, of course, the same size as the cameos that is small in relation to a frame and so several cameos may be manipulated in one field period. The addresses are called a coarse map and for each cameo in one field the line and pixel addresses will be interpolated to provide addresses for all points within the cameo. For the next field period the address map will be temporally and spatially interpolated to give addresses giving the next transformation in a sequence. This interpolated map will be the same for all the cameos manipulated in a field period. Each address map is calculated by operating on an initial address map using matrix transforms. The address calculations are performed in three dimensions (namely, horizontal position, vertical position and distance from the image plane) but the addresses for each map are, before use, converted to two dimensions in the course of which they are corrected for perspective.

Figure 3B:
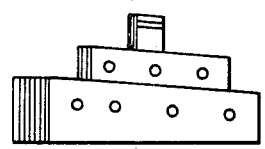

To produce the image as seen in FIG. 3b each cameo must be manipulated so that the ship appears to have rotated about the xx' axis. If at the same time the cameo is also compressed it will appear in the output image that the ship is turning and moving away from the observer. The use of the manipulator allows a wide range of manipulation to be produced and the type of manipulation can be operator controlled. After manipulation the priority signals ensure that the plane represented by each cameo will still appear to be at the correct position within the object.

Once the cameos have been manipulated they are stored in the frame store 4 which acts as a buffer and can then be read into the combiner 5. The combiner may be of the form described in our co-pending application No. 8503738. Video signals from the same address in each cameo are read into the combiner in parallel and the signal from each cameo forms one input to an arbitrator. The secon input to the first arbitrator is the background video signal. Each arbitrator carries out a selection which outputs the video signal of the highest priority plus its associated key signal and the video signals of the next highest priority. These then form inputs to the next arbitrator where the selection again occurs. The output of the selection stage is then two video signals and a key signal and the video signals are combined using the key signal and stored in output store 7 at the position at which it will appear in the output image. Where there is no video signal representing the object present, background signals are inserted and when only one cameo signal is present this is keyed to the background signal. The key signal will of course be soft edged and there will be blending of the signal so that if there are enough cameos the object will appear to be solid. Taking the case of the rotated ship in FIG. 3b the video signals representing the first plane will have the highest priority and part of plane 1 will only appear when no video signals from plane 0 are present. These parts are shown shaded in FIG. 2c.

As the ship rotates there will be a point where the plane originally furthest from the observer will become the nearest an at this point the priority order of the tiles will be switched to take this into account or different tiles will be selected giving a rear view of the object. There may be signals at the ends of each cameo of the object to provide more realistic images when the object is viewed at 0° or 180°. In the example of the ship for instance the first and last pixels in each line of the image of the ship will be in different colours so that when the ship is heading away from or towards the observer a different colour will be seen. This manipulation and combining of the cameos is such that the images are reconstructed in normal field rate.

It is to be understood that there may be three sets of cameos provided to allow for coloured images.

Figure 4:
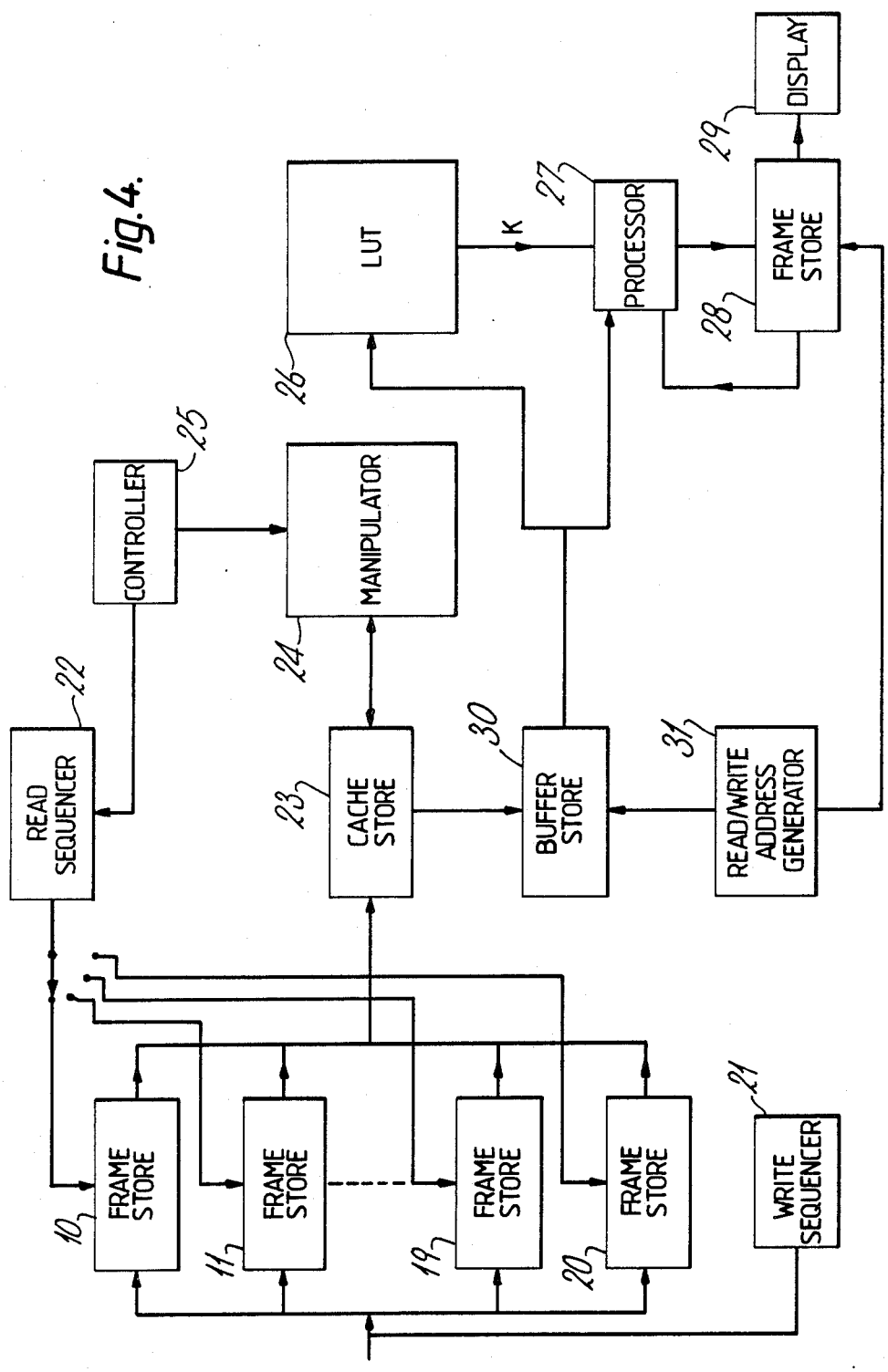
FIG. 4 shows the processing system which processes medical images and is a second embodiment of this invention.

A second embodiment of this invention shown in FIG. 4 is capable of manipulating signals representing images of a part of a patient, these signals being obtained from medical imaging systems. This embodiment will be described using as an example images of the skull and brain where the part of interest is a brain tumour. The signals produced by medical scanners are digital video signals wherein each frame represents a different parallel scan of the skull. Each frame would typically consist of 512×512 picture points or 256×256 picture points. Diagramatic representations of the type of images represented by the signal frames received can be seen in FIG. 5a.

The frames of video signals are received by the system and written respectively into the stores 10-20. This embodiment is shown with ten incoming frames of signals but it will be appreciated that the number received need not be confined to ten. Write sequencer 21 operates so that the video signals representing the first section scanned is stored in frame store 10 and the next section in frame store 11 and so on until the last section scanned is stored in frame store 20. Read sequencer 22 can then operate to ensure that the frames of signals are read out sequentially starting at frame store 10 or 20 depending on the orientation of the image required. In the example shown in FIG. 5a the signals representing the plane at $Z_1$ will be stored in frame store 10 and that at $Z_{10}$ in frame store 20, but the write sequencer could also sequence the frames in the reverse order in which case $Z_1$ would be stored in frame store 20.

The frames of video signals stored in frame stores 10-20 can be considered to be equivalent to the cameos in the first embodiment however consisting of a whole frame of signals rather than a small patch. The operator may control which viewing position is to be simulated and dependent on this position the read sequencer operates to read the signals from frame store 10 or 20 to cache store 23 which will now store a frame of signals. The frame that appears furthest from the viewer is read first to the cache store. As in the previous embodiment this store allows faster access to the manipulator. The manipulator 24 also acts in the same manner as previously described using address maps to manipulate the signals to produce a change in orientation of the part of the patient in the output image.

For example, FIG. 5a represents diagrammatically the type of images (called tomographs) obtained from a series of scans of the skull when viewed along the Z axis. In the scans obtained the difference between the tumour and brain would probably not be so pronounced. If the rotating position from which the skull is viewed is to be simulated as having rotated about the Y axis from the original position then the signals representing the plane at $Z_1$ would be manipulated to produce the effect of this in the output image and appear to be rather like that seen in FIG. 5d. The other frames of signals would be manipulated in the same manner.

Once the frame of signals have been manipulated as desired they are written into buffer store 30 and the next frame is written into cache store 23 for manipulation in the same manner. This continues until all ten frames have been manipulated in this way and combined and then the controller 25 instructs the manipulator so that the manipulation corresponding to the next change in position is carried out. It is envisaged that the manipulation and combination will typically take 1 second for 20 frames. Although this will result in a somewhat jerky image it is not considered to be an important disadvantage.

Although the manipulated signals could be combined the same way as in the previous embodiment it has been found that better results can be obtained in a manner described below. The signals from buffer store 30 are read to look up table 26 which operates to produce control signals defining the parts of interest in the three dimensional object. The look up table is such that signals which fall within a predetermined range of values are alotted a vlue K which is high and those outside the range a low value of K. At the boundary intermediate values of K are used to produce blending in the final image. Typically K will be between (or equal to) 0 and 1. In the images shown in FIG. 5a a simple effect would be such the look up table is programmed so that the signal values which define the tumour are allocated a high value of K and all other values a low K. In the final image the tumour would be seen more easily nd if K is chosen as 1 and 0 respectively only the tumour would be seen. There may, however, be two or more ranges chosen to have high associated values of K so that for example both the skull and the tumour can be seen in the output images. The look up table may also act to map different values onto different colours.

The output video signal is obtained for a particular image point by building it up by adding a proportion K of the video signal for the section of each priority level to a proportion (1−K) of the contribution made to the output video signal from the signals for the sections of lower priority levels. This is done in processor 27. As the value of K for a picture point is read from look up table 26 to processor 27 the corresponding picture point signal from buffer store 30 and frame store 28 are also applied by means of read/write address generator 31. The processor operates to produce $P_n = KP_i + (1-K)P_s$ where $P_n$ is the new picture point, $P_i$ the picture point from buffer store 30 and $P_s$ the picture point from frame store 28, and once produced the new picture point is stored in frame store 28 at the correct address. It can be seen that in this way if the read sequencer 22 operates so that the plane furthest from the observer is read from the frame stores 10-20 first then the output image will gradually build up in frame store 28 for display on display 29. The nearest plane to the observer will be processed last. The type of processor used here is described in our UK Pat. No. 2089625 and produces a realistic image when used in this way. In contrast to the combiner described with reference to FIG. 1 wherein only signals from the nearest and next nearest planes are combined each picture point in this embodiment will be made up of contributions from all planes at that point.

If the planes represented in FIG. 5a were to be combined without change in viewing position but after application to the look up table an image like that in 5b could be obtained the tumour which is inclined to the $Z_2$ plane appears now as an elongated object. Similarly after applying the manipulations discussed earlier to all sections an image such as FIG. 5c could be obtained where it can be seen that a different position for the observer is simulated in this example a rotation about the Z axis. By producing and manipulating an image in this way a doctor can more easily see the extent and position of a tumour. The combination of the signals selected from successive sections can produce a shadow on the image of the tumour which is a function of the density of the tissue, increasing the realism of the image.

It is to be understood that the signals from buffer store 30 need not be used to form the second input to processor 27 as this could be a luminance or chrominance signal dependent on what is desired in the output image. In this case the frame of video signals would be applied only to the look up table to produce the factor K before manipulation.

The look up table provides a very versatile range of effects which could be used to cause, say, the bone to become transparent when in front of the tumour. It is also possible to introduce surface normal shading into the image that is to simulate the effect of a light shining on the part of the patients body from the viewing position.

It is to be understood that the manipulation and combination of the images need not be limited as described herein.

We claim:

1. A video image processing system comprising:
   an input store for a plurality of video image signals representing substantially parallel two-dimensional slices of a three-dimensional object spaced in a substantially orthogonal direction to the plane of each slice;
   manipulating means for changing the position or orientation of each slice by processing said video image signals to thereby generate processed video signals representing manipulated slices; and
   combining means for combining selected processed video signals representing portions of said manipulated slices to produce output image signals representing the three-dimensional object manipulated in accordance with changes applied to the position or orientation of said slices.

2. A system according to claim 1 further comprising:
   means for storing a priority signal and a key signal with said video image signals for each picture point of said slices;
   selector means including means for selecting for each picture point in the output image signals said video image signals with the highest priority and said video image signals with the next highest priority;
   means for selecting the key signal associated with the video image signals with the highest priority; and
   means for combining said video image signals in proportions determined by said key signal.

3. A system according to claim 2 wherein said selector means includes means for generating a background signal and means for combining said background signal with said output image signals.

4. A system according to claim 2 including means for changing said priority signals in dependence on the orientation of the object in the image with respect to an observer.

5. A system according to claim 1 wherein said manipulating means includes:
   store means for storing manipulated signals;
   means for writing incoming signals into said store means at addresses determined by the manipulation to be applied; and
   means for providing said addresses in the form of address maps.

6. A system according to claim 1 wherein said manipulating means includes means for correcting for perspective in the output image.

7. A system according to claim 1 wherein said manipulating means includes fast access store means.

8. A video image processing system according to claim 1 wherein signals representing several different planes of the object are stored in one frame store.

9. A method of processing video images comprising:
   storing a plurality of input video image signals representing substantially parallel two-dimensional slices of a three-dimensional object spaced in a substantially orthogonal direction to the plane of each slice;
   manipulating said input video image signals so as to change the position or orientation of the image of each slice, and combining selected portions of each manipulated video image signal to produce an output image signal representing said three-dimensional object manipulated in accordance with the manipulations applied to said slices.

10. A method of processing video images according to claim 9 wherein said video signals representing images of successive slices are stored with priority signals, representing the position of said slice within the object, and key signals, in which manipulated video signals are combined in response to said priority signals and said key signals.

11. A method according to claim 9 wherein said processing of each image is such as to preserve perspective in the image.

12. A method of processing medical images comprising the steps of:
   producing video signals representing images of successive tomographs of a part of a patient wherein each tomograph represents a two-dimensional slice and said slices are spaced in a substantially orthogonal direction to the plane of each slice;
   separately manipulating the video signals of each image to represent the transformation which occurs in the image of the respective tomographs as a result of a common change of the position or orientation of the tomographs with respect to an observer; and
   selectively combining video signals representing the different transformed images to produce an output image representing said part of the patient as seen from a desired viewpoint.

13. A method according to claim 12 in which said video signals are manipulated by writing said signals into addresses in the store, said addresses being determined by said transformation and provided as an address map.

14. A method according to claim 13 further comprising:
   correcting said address maps so that the image appears with the correct perspective.

15. A method according to claim 12 further comprising:
   producing control signals defining areas of interest in the images; and
   utilizing said control signals in the combination of the planes to produce an image representing said part of the patient with said areas of interest being more clearly visible.

16. A method according to claim 15 further comprising:
   combining for each picture point the transformed signals in each tomograph with signals from the preceding tomographs in proportions determined by said control signals.

17. A medical image processing system comprising:
   means for receiving a plurality of frames of video signals representing substantially parallel two-dimensional slices of a part of a patient spaced in a substantially orthogonal direction to the plane of each slice;
   frame store means for storing said signals;
   manipulating means for manipulating said signals to produce the effect of a change in orientation in said part of the patient;
   means for processing said manipulated signals to produce control signals, said control signals being such as to define parts of interest in said slices; and
   combining means for combining the manipulated signals to produce output signals representing the image of said part of the patient at a given orientation with those areas of interest being clearly defined.

18. A system according to claim 17 wherein said manipulating means includes operator control means to control the type of manipulation applied to said signals.

19. A system according to claim 17 wherein said manipulating means includes fast access store means.

20. A system according to claim 17 wherein said processing means comprises a look up table.

21. A system according to claim 16 wherein said combining means includes means for combining signals from successive manipulated slices with signals combined from the preceding slices in proportions determined by said control signal.

22. A medical image processing system comprising:
   means for receiving a plurality of frames of video signals representing different parallel slices of a part of a patient;
   frame store means for storing said signals;
   means for processing said signals to produce control signals defining parts of interest in said slices;
   means for manipulating said control signals to produce the effect of a change in orientation in said part of patient;
   a source of video signals with predetermined values;
   a second frame store means;
   combining means for combining incoming signals with predetermined values and signals stored at the corresponding address in said second frame store means in dependence on said control signal;
   means for writing said combined signal in said address in said second framestore means; and
   means for displaying signals from said second frame store means.

* * * * *